United States Patent
Zolotow et al.

(10) Patent No.: US 10,581,702 B2
(45) Date of Patent: Mar. 3, 2020

(54) AUTOMATIC CREATION OF STANDARD SERVICE LEVEL AGREEMENTS FOR ARCHITECTURES

(71) Applicant: INTERNATIONAL BUSINESS MACHINES CORPORATION, Armonk, NY (US)

(72) Inventors: Clea A. Zolotow, Key West, FL (US); Tomasz Gola, Dublin (IE); Petra Kopp, Toenisvorst (DE); Laxmikantha S. Nanduru, Secunderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

(21) Appl. No.: 16/038,693

(22) Filed: Jul. 18, 2018

(65) Prior Publication Data
US 2020/0028755 A1    Jan. 23, 2020

(51) Int. Cl.
*G06F 15/16* (2006.01)
*H04L 12/24* (2006.01)

(52) U.S. Cl.
CPC .......... *H04L 41/5009* (2013.01); *H04L 41/04* (2013.01); *H04L 41/5032* (2013.01)

(58) Field of Classification Search
CPC .. H04L 41/5009; H04L 41/04; H04L 41/5032
See application file for complete search history.

(56) References Cited

U.S. PATENT DOCUMENTS

| | | | |
|---|---|---|---|
| 8,645,529 B2 | 2/2014 | Doddavula | |
| 8,862,883 B2 * | 10/2014 | Cherukuri | H04L 41/0803 713/151 |
| 8,934,357 B2 | 1/2015 | Ravindran et al. | |
| 9,311,611 B2 | 4/2016 | Suer et al. | |
| 9,385,926 B2 * | 7/2016 | Leung | H04L 41/5006 |

(Continued)

OTHER PUBLICATIONS

Anonymous, "Service Level Management concepts", http://wiki.servicenow.com/index.php?title=Service_Level_Agreements#gsc.tab=0, Jakarta, accessed Jul. 16, 2018, 2 pages.
(Continued)

*Primary Examiner* — Moustafa M Meky
(74) *Attorney, Agent, or Firm* — James Nock; Andrew D. Wright; Roberts Mlotkowski Safran Cole & Calderon, P.C.

(57) ABSTRACT

Systems and methods for automatically generating standard service level agreements for architectures are disclosed. In embodiments, a method comprises receiving a request from a client, the request including: one or more select information technology (IT) building blocks selected from a plurality of IT building blocks in an online service catalogue; and a select service level target (SLT) from a plurality of predetermined SLTs in the service catalogue; automatically generating an architecture based on the request utilizing the service catalogue, the architecture comprising at least one IT building block different from the one or more select IT building blocks, wherein the architecture is capable of meeting objectives of the request; determining that the architecture meets the select SLT; accessing an architecture database; and automatically generating an infrastructure SLA based on the architecture utilizing the architecture database.

20 Claims, 7 Drawing Sheets

(56) References Cited

U.S. PATENT DOCUMENTS

| | | | | |
|---|---|---|---|---|
| 9,444,789 | B2* | 9/2016 | Cherukuri | H04L 41/0803 |
| 9,854,031 | B2* | 12/2017 | Ha | H04L 41/5009 |
| 10,061,692 | B1* | 8/2018 | Nicklin | G06F 3/067 |
| 2006/0200477 | A1* | 9/2006 | Barrenechea | G06F 16/284 |
| 2013/0132162 | A1* | 5/2013 | Banerjee | G06Q 10/0637 |
| | | | | 705/7.36 |
| 2013/0311778 | A1* | 11/2013 | Cherukuri | H04L 63/0272 |
| | | | | 713/171 |
| 2014/0372761 | A1* | 12/2014 | Cherukuri | H04L 63/0272 |
| | | | | 713/171 |
| 2015/0180736 | A1* | 6/2015 | Leung | H04L 41/5006 |
| | | | | 709/226 |
| 2016/0065417 | A1* | 3/2016 | Sapuram | G06Q 30/0631 |
| | | | | 709/223 |
| 2016/0188735 | A1* | 6/2016 | Bastide | H04L 51/046 |
| | | | | 707/722 |

OTHER PUBLICATIONS

Paschke et al., "Knowledge Representation Concepts for Automated SLA Management", https://arxiv.org/ftp/cs/papers/0611/0611122.pdf, Mar. 19, 2006, 41 pages.

Badidi et al., "A framework for automated SLAs management in service-oriented environments", https://ieeexplore.ieee.org/document/6911351/, 2014 International Conference on Multimedia Computing and Systems (ICMCS), Apr. 14-16, 2014, 2 pages.

Anonymous, "IBM Cloud Brokerage, formerly known as IBM cloudMatrix, can enable enterprises to adopt a new operating model in order to personalize IT service consumption", https://www-01.ibm.com/common/ssi/cgi-bin/ssialias?subtype=ca&infotype=an&supplier=897&letternum=ENUS216-170, IBM, Oct. 25, 2016, 16 pages.

* cited by examiner

AUTOMATIC CREATION OF STANDARD SERVICE LEVEL AGREEMENTS FOR ARCHITECTURES

BACKGROUND

The present invention relates generally to service level agreements (SLAs) and, more particularly, to the automatic creation of standard SLAs for computing architectures.

Presently, a variety of cloud-based information technology (IT) management systems are available to enable a service provider to manage resources (e.g., computer hardware, software, data, networks and data center facilities) for one or more clients (e.g., internal or remote clients). One tool that may be used by IT managers is an online service catalogue, which may be accessed by one or more clients. In general, a service catalogue provides the ability to contain critical information in a central repository accessible by both the IT service provider and their client(s). In general, service catalogues may include a user interface which enables users to request specific services or IT solutions from one or more vendors. For example, a service catalogue may include a plurality of selectable icons and means for entering information (e.g., number and type of hardware components to be requested, etc.).

An IT service provider may provide clients with an end-to-end (E2E) solution such as Infrastructure as a Service (IaaS) or Software-as-a-Service (SaaS), wherein the service provider supplies an application program or system to run the program, along with all the hardware and/or software components and resources to meet the client's requirements, such that no other parties need be involved.

A commitment between an IT service provider and a client is referred to as a service-level agreement (SLA). The SLA includes particular aspects of a service agreed to by the parties, such as quality, availability and responsibilities. An element of the SLA may be a Service Level Objective (SLO). SLOs are agreed upon as a means of measuring the performance of a service provider, such as availability, throughput, frequency, response time or quality. SLAs may include a technical definition in mean time between failure (MTBF), mean time to repair or mean time to recovery (MTTR), which identify: which party is responsible for reporting faults or paying fees; the responsibilities for various data rates; throughput; jitter; or similar measurable details.

Typically, predefined SLAs for individual IT components (e.g., hardware components, network appliance disk uptime, disaster recovery, etc.) may be looked up and utilized as a starting point for negotiating an application or infrastructure SLA. Today, such infrastructure SLAs (e.g., E2E application services) are developed manually by administrators, who may take into account predefined SLAs associated with individual components (e.g., hardware) utilized in providing the IT services.

SUMMARY

In an aspect of the invention, a computer-implemented method includes: receiving, by a computing device, a request from a client, the request including: one or more select information technology (IT) building blocks selected from a plurality of IT building blocks in an online service catalogue; and a select service level target (SLT) from a plurality of predetermined SLTs in the service catalogue; automatically generating, by the computing device, an architecture based on the request utilizing the service catalogue, the architecture comprising at least one IT building block different from the one or more select IT building blocks, wherein the architecture is capable of meeting objectives of the request; determining, by the computing device, that the architecture meets the select SLT; accessing, by the computing device, an architecture database comprising predefined service level agreement (SLA) components mapped to each of the plurality of IT building blocks in the service catalogue; and automatically generating, by the computing device, an infrastructure SLA based on the architecture utilizing the architecture database, wherein the infrastructure SLA comprises the at least one building block of the architecture and measurable objectives associated with the at least one building block of the architecture.

In another aspect of the invention, there is a computer program product for automatically generating standard service level agreements for architectures. The computer program product comprises a computer readable storage medium having program instructions embodied therewith. The program instructions are executable by a computing device to cause the computing device to: provide a service catalogue comprising a plurality of information technology (IT) building blocks and a plurality of predetermined service level targets (SLTs); receive a request from a client; automatically generate an architecture to meet objectives of the request utilizing the service catalogue; access an architecture database comprising predefined service level agreement (SLA) components mapped to each of the plurality of IT building blocks in the service catalogue; and automatically generate an infrastructure SLA based on the architecture utilizing the architecture database, wherein the infrastructure SLA comprises measurable objectives associated with one or more hardware or software components of the architecture.

In another aspect of the invention, there is a system for automatically generating standard service level agreements for architectures. The system includes a CPU, a computer readable memory and a computer readable storage medium associated with a computing device; program instructions to receive a request from a client, the request including one or more select IT building blocks from a plurality of IT building blocks in a service catalogue and a select service level target (SLT) from a plurality of predetermined SLTs in the service catalogue; program instructions to automatically generate an architecture to meet objectives of the request utilizing the service catalogue, wherein the architecture comprising one or more hardware or software components selected from the plurality of IT building blocks in the service catalogue; program instructions to determine that the architecture meets the select SLT; program instructions to access an architecture database comprising predefined service level agreement (SLA) components mapped to each of the plurality of IT building blocks in the service catalogue; and program instructions to automatically generate an infrastructure SLA based on the architecture utilizing the architecture database, wherein the infrastructure SLA comprises the one or more hardware or software components selected from the plurality of IT building blocks in the service catalogue, as well as measurable objectives associated with the one or more hardware or software components, wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIG. 1 depicts a computing infrastructure according to an embodiment of the present invention.

DETAILED DESCRIPTION

Figure 1:
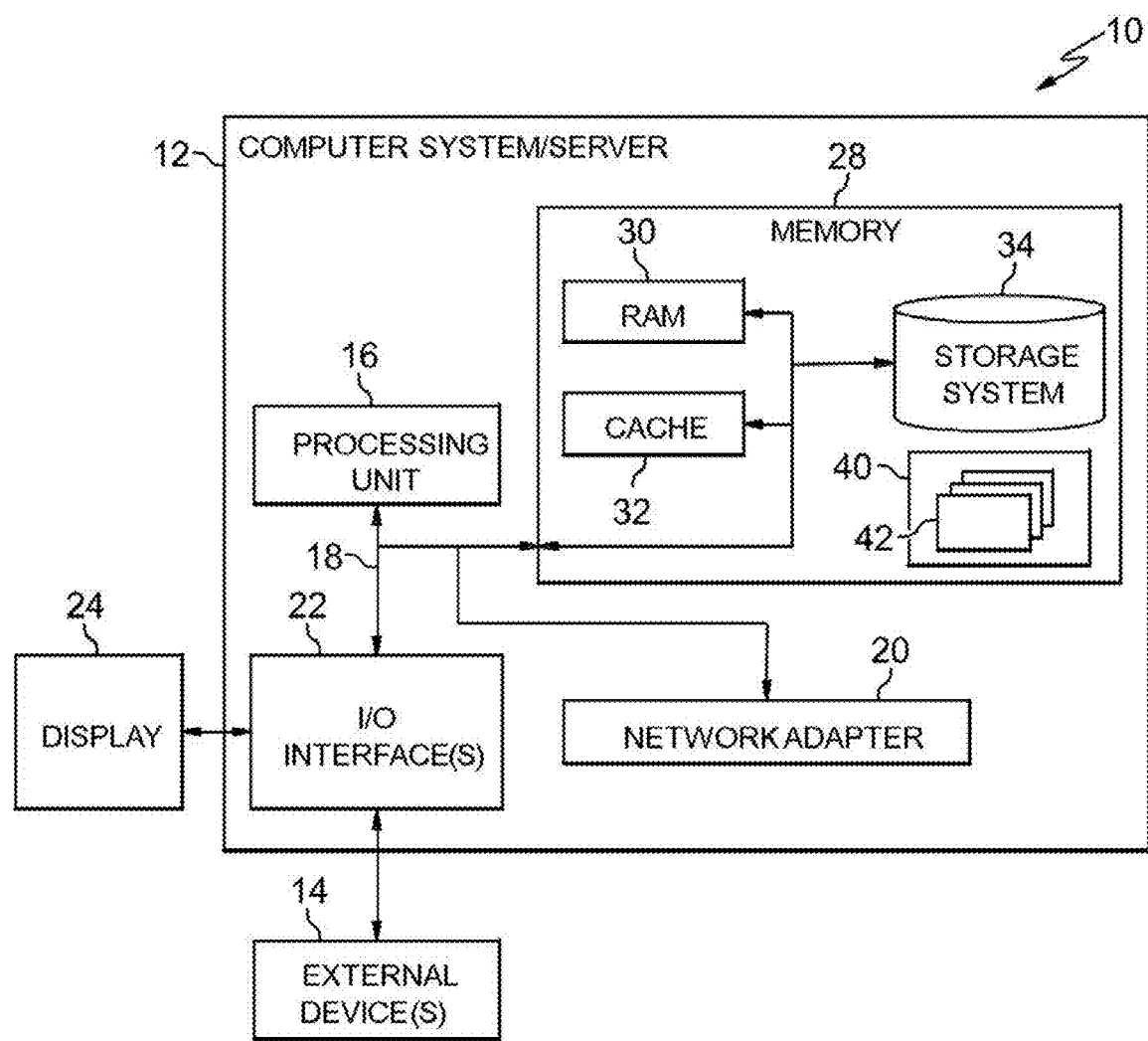

The present invention relates generally to service level agreements (SLAs) and, more particularly, to the automatic creation of standard SLAs for architectures. In embodiments, a system is provided for automatically generating infrastructure service level agreements (SLAs) from architectural diagrams produced from a service catalog. Infrastructure SLAs may be utilized as a starting point for an infrastructure or application SLA. In aspects, a system of the invention automatically creates standard SLAs for architectures utilizing service catalog's building blocks while also keeping an integrated database of architecture design elements and logged SLAs. Such a system provides the capability to respond to changes in an SLA, as well as architecture changes. In aspects, the system is configured to compare the changes in the SLA with previous changes and SLAs for increased accuracy. For example, the system may compare real time delivery performance data regarding mean time between failure (MTBF) and mean time to repair (MTTR) to stored data in SLAs and may update the SLAs as needed.

Currently, while there exists defined SLAs for individual IT building blocks such as disk uptime and disaster recovery, there are no defined SLAs for component environments. For example, there are not defines SLAs for a 3-tier system with a web-facing server, a middleware component, and a database. Various tools may be utilized to auto-create architectures for placement into a hybrid cloud environment utilizing a service catalog construct. However, these tools create building blocks and architectures which currently are only used for determining the cloud placement. In existing approaches, SLAs are only done automatically via lookup for individual components, and are negotiated individually for applications; a process that may take weeks or months.

Advantageously, systems and methods of the present invention provide a technical solution to the technical problem of automatically defining SLA agreements for on-demand IT business/service requests. Embodiments of the invention provide vast improvements to the functioning of IT service provider systems. More specifically, aspects of the invention utilize the unconventional steps of: mapping SLA components to individual IT building blocks in an IT service catalog; and automatically generating (and re-generating based on agile changes) infrastructure SLAs from the mapped data based on an architecture generated from a service catalog business request.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
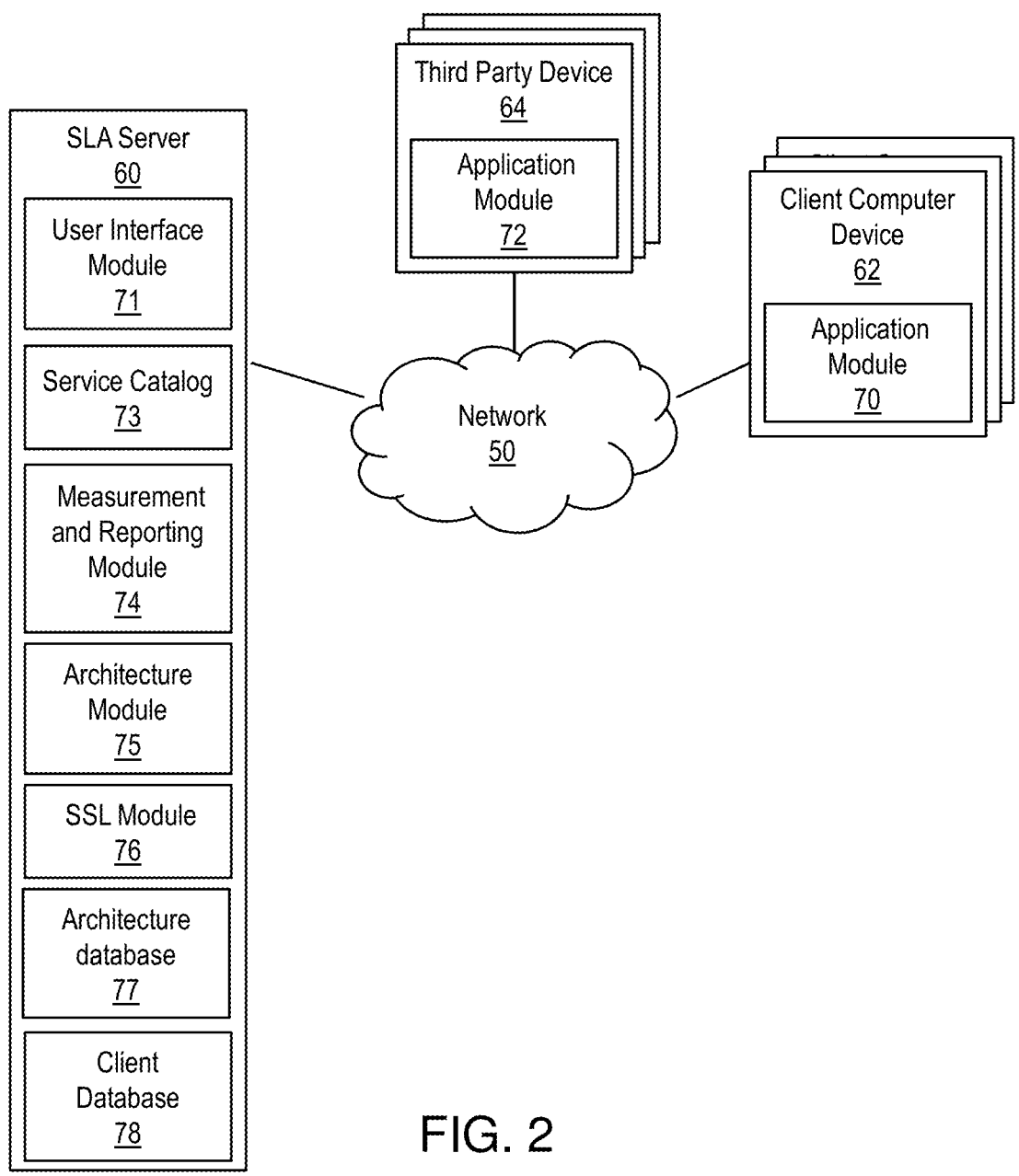
FIG. 2 shows an exemplary environment in accordance with aspects of the invention.

FIG. 2 shows an exemplary environment in accordance with aspects of the invention. The environment includes a network 50 connecting a service level agreement (SLA) server 60 with one or more computing devices such as one or more client computing devices 62 and one or more third party devices 64 (e.g., third party service provider devices). The SLA server 60 may comprise a computer system 12 of FIG. 1, and may be connected to the network 50 via the network adapter 20 of FIG. 1. The SLA server 60 may be configured as a special purpose computing device that is part of an IT service provider infrastructure. For example, the SLA server 60 may be a cloud-based server configured to provide an IT service catalogue to a plurality of remote clients via the network 50.

The network 50 may be any suitable communication network or combination of networks, such as a local area network (LAN), a general wide area network (WAN), and/or a public network (e.g., the Internet). The client computer device 62 may be in the form of the computer system 12, and may be a desktop computer, laptop computer, tablet computer, smartphone, etc. In embodiments, the client computer device 62 runs an application program from an application module 70 that provides an interface by which a client may enter an IT business request to be submitted to the SLA server 60 (e.g., via a user interface module 71 of the SLA server 60). Similarly, the third party device 64 may be in the form of the computer system 12, and may be a desktop computer, laptop computer, tablet computer, smartphone, etc. The third party device 64 may run an application program from an application module 72 that provides in interface by which a third party may communicate with the SLA server 60 (e.g., via the user interface module 71).

Still referring to FIG. 2, the SLA server 60 may comprise a plurality of program modules (e.g., program module 42 of FIG. 1) executed by the SLA server 60 and configured to perform one or more of the functions described herein. In embodiments, the SLA server 60 includes the user interface module 71 for communicating with one or more application modules 70, 72 of client computer devices 62 and/or third party devices 64. The SLA server 60 may be an in-house server configured to communicate with one or more internal clients via the network 50 (e.g., intranet), or may be in the form of a cloud-based server in communication with a plurality of remote clients via the network 50 (e.g., Internet). The SLA server 60 may provide one or more clients and/or third parties access to a service catalog 73 via the network 50. In aspects, the service catalog 73 is in the form of a central repository accessible by both an IT service provider and their client(s). In aspects, the service catalogue 73 is configured with a user interface which enables clients to request specific services or IT solutions from one or more vendors or service providers.

In embodiments, the SLA server 60 includes a measurement and reporting module 74 configured to record real service delivery performance data received. In aspects, real service delivery performance data is data related to quantifiable aspects of IT services which have been delivered, such as mean time between failure (MTBF) data and mean time to repair (MTTR) data. In aspects, the measurement and reporting module 74 is also configured to update service delivery performance data in the service catalog 73 for related IT building blocks (e.g., individual services, software or hardware components) in the service catalog 73.

In embodiments, the SLA server 60 includes an architecture module 75 configured to generate an architecture based on a business request received from a client. In aspects, the architecture module 75 utilizes information regarding one or more IT building blocks in the business request to determine what IT building blocks are necessary to meet the clients goals, and generates an architecture based on the determination. The term "architecture" as used herein refers one or more hardware and/or software components (e.g., building blocks from the service catalog) necessary to address the business request.

With continued reference to FIG. 2, the SLA server 60 may include a standard service level (SSL) module 76 configured to automatically generate an infrastructure SLA based on the architecture generated by the architecture module 75. In aspects, the SSL module 76 utilizes an architecture database 77 comprised of individual SLA components mapped to individual IT building blocks of the service catalogue to generate the infrastructure SLA. The term "infrastructure SLA" as used herein refers to a service level agreement (SLA) comprising one or more IT building blocks of the architecture and measurable objectives (e.g., MTTR, MTBF) associated with the one or more IT building blocks of the architecture.

The SLA server 60 may also include a client database 78 for storing information regarding one or more clients, including business process management (BPM) data. BPM data refers to data associated with modeling, automation, execution, control, measurement and optimization of business activity flows, in support of client (enterprise) goals. BPM data and the like may be obtained from one or more remote computing devices such as the client computer devices 62 or third party devices 64 via the network 50.

In embodiments, the SLA server 60 may include additional or fewer components than those shown in FIG. 2. In embodiments, separate components may be integrated into a single computing component or module. Additionally, or alternatively, a single component may be implemented as multiple computing components or modules.

Figure 3A:
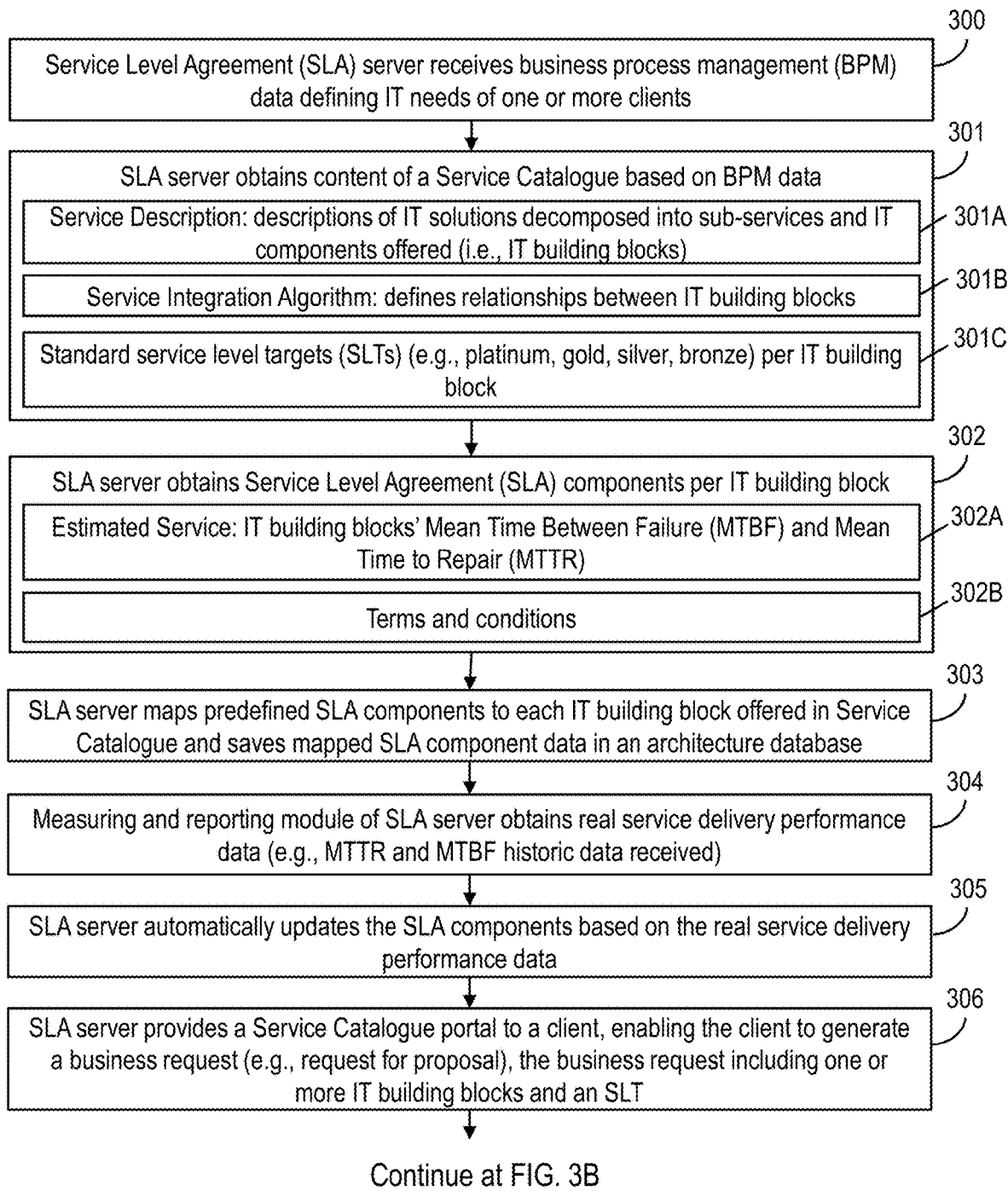
FIGS. 3A and 3B show a flowchart of steps of a method in accordance with aspects of the invention.
Figure 3B:
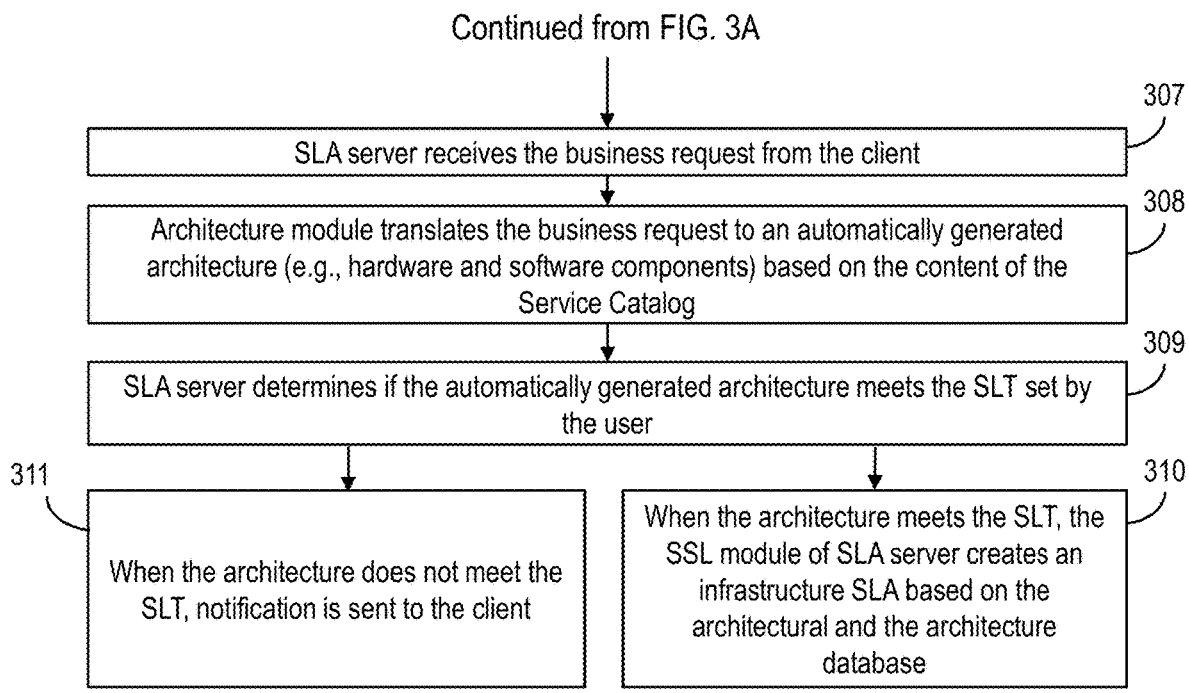

FIGS. 3A and 3B show a flowchart of a method in accordance with aspects of the invention. Steps of the method of FIGS. 3A and 3B may be performed in the environment illustrated in FIG. 2, and are described with reference to elements shown in FIG. 2.

With initial reference to FIG. 3A, at step 300, the SLA server 60 receives business process management (BPM) data defining IT needs of one or more clients. The SLA server 60 may store the BPM data or other client specific data in the client database 78 of the SLA server 60. In aspects, the SLA server 60 receives BPM data from one or more remote computer devices, such as the client computer devices 62 or third party devices 64. BPM data may include, for example, data regarding a company's business processes and structure, or other data enabling an IT service provider to meet the company's business goals.

At step 301, the SLA server 60 obtains content of a service catalogue based on the BPM data received at step 300. The SLA server 60 may create the service catalogue with input from one or more creators/administrators. The term "service catalogue" as used herein refers to a computer-based catalogue of IT solutions or IT building blocks accessible to both clients and an IT services provider. In embodiments, the service catalogue is provided to clients via a user interface enabling the clients to select (e.g., via icons and the like) one or more IT building blocks such as hardware, software and services (e.g., data recovery services). In aspects, each IT building block listed in the service catalogue is associated with information regarding the IT building block. Additional details regarding contents of the service catalogue are discussed with reference to substeps 301A-301F below.

At substep 301A, the SLA server 60 obtains descriptions of IT solutions decomposed into sub-services and IT components (e.g., hardware and software) to be offered in the service catalogue, wherein the IT solutions and IT components are referred to herein as IT building blocks. IT solutions may include, for example: application, database and web development services; disaster recovery services; production services; and test services. IT components may include, for example, application servers, database servers, data storage tools, and network tools.

At substep 301B, the SLA server 60 obtains one or more service integration algorithms defining relationships between IT building blocks. For example, certain IT solutions will necessarily utilize certain IT components and multiple IT solutions may utilize some of the same overlapping IT components or IT building blocks. Accordingly, a mapping or database of relationships between IT building blocks enables the SLA server 60 to generate an architecture based on particular IT building blocks requested by a client, wherein the client's particular needs can be determined utilizing the service integration algorithms and user specific data saved in the client database 78.

At substep 301C, the SLA server 60 obtains service level targets (SLT) for individual IT building blocks of the service catalogue. SLTs may comprise one or more of: a monetary price; a measurement methodology; a proposal of a required measurement and reporting solution; a proposed SLA effective date; and an SLT indicator. In aspects, the service catalogue of the present invention includes a plurality of user-selectable SLT indicators representing different levels or classes of IT solutions, wherein the IT building blocks are each associated with an SLT indicator. For example, the SLT indicators may be "platinum", "gold", "silver" or "bronze", wherein the SLTs are listed in order from the most robust solution (platinum) to the least robust solution (bronze). In this example, a computer server in the service catalogue having the highest level of processing power may be associated with the SLT indicator "platinum", while a computer server having the lowest level of processing power may be associated with the SLT indicator "bronze". In embodiments, offerings of the service catalogue may be organized using a plurality of filters. For example, a user may filter IT building blocks by Environment, Layer, Application or Network. A variety of service catalogue tools and methods may be utilized in the implementation of step 301, and the present invention is not intended to be limited to the examples provided herein.

At step 302, the SLA server 60 obtains SLA components for individual IT building blocks of the service catalogue. The term "SLA components" as used herein refers to parts of an agreement between a service provider and a client, wherein the agreement includes particular quantifiable and assignable aspects of a service such as quality, availability and responsibilities. In embodiments, the SLA components comprise details or parts of an SLA specific to individual IT building blocks. For example, an IT building block comprised of disaster recovery for a database may include quantifiable delivery goals and assigned responsibilities in an associated SLA component. It should be understood that different SLA components or groups of components may be associated with different IT building blocks within the service catalogue.

In embodiments, at substep 302A the SLA server 60 obtains the SLA components mean time between failure (MTBF) and mean time to repair (MTTR). MTBF refers to the predicted elapsed time between inherent failures of a system, during normal system operation. In aspects, the MTBF is the arithmetic mean (average) time between failures of a system. MTBF depends on a definition for what is considered failure, and the definition for failure may be included in the SLA components. MTTR refers to a basic measure of the maintainability of repairable items. In aspects, the MTTR is the average time required to repair a failed component or device in a system. The MTTR may include a definition determining how the MTTR is calculated (e.g., from discovery of failure until repair is completed, or between the point repair begins until repair is completed). In aspects, the SLA server 60 may obtain real delivery performance data in the form of MTBF and MTTR data based on actual failures and repairs of a system addressed by an IT provider (e.g., provider of SLA server 60). Such real delivery performance data may be obtained continuously or periodically, and may be utilized to update the SLA components of the service catalogue as discussed in more detail below at step 304.

In embodiments, substep 302B comprises the SLA server 60 obtaining terms and conditions associated with respective IT building blocks of the service catalogue. Terms and conditions may include, for example, data rates, throughput, jitter or similar measurable details.

At step 303, the SLA server 60 maps predefined SLA components obtained at step 302 with individual IT building blocks offered in the service catalogue and saves the mapped SLA component data in the architecture database 77. For example, SLA components associated with disaster recovery services would be mapped to respective disaster recovery services (IT building blocks) offered in the service catalogue. It should be understood that one or more SLA components may be mapped to an individual IT building block.

At step 304, the SLA server 60 obtains real service delivery performance data. In aspects, the measuring and reporting module 74 of the SLA server 60 obtains real service delivery performance data from one or more sources based on actual services provided by the IT service provider (e.g., provider of the SLA server 60). In embodiments, the SLA server 60 obtains MTTR and MTBG data based on services provided to one or more clients.

At step 305, the SLA server 60 automatically updates the SLA components of step 302 based on the real service delivery performance data obtained at step 304. In aspects, step 305 comprises updating the architecture database 77 to include updated SLA component information (e.g., updated MTTR and MTBG per associated IT building block). In this way, the SLA server 60 can utilize SLA components that reflect real-world capabilities as evidenced by the real-world MTTR and MTBG data received at step 304. Thus, SLA component updates may be automated, eliminating the need for human calculation and decision making regarding at least some of the quantifiable SLA components utilized by the present invention.

At step 306, the SLA server 60 provides a service catalogue portal to a client, enabling the client to generate a business or service request (request). In embodiments, the request includes one or more IT building blocks selected from options in the service catalogue, as well as an SLT selected from a plurality of SLTs. In embodiments, the SLT of the request is selected from the SLT indicators: platinum, gold, silver and bronze.

Turning to FIG. 3B, at step 307, the SLA server 60 receives a request from a client, wherein the request is generated from the service catalogue portal of step 306. The request may include one or more IT building blocks selected from IT building blocks offered in the service catalogue, including IT services and/or IT components. In embodiments, the request includes an SLT (e.g., a quantifiable target such as uptime/availability of a system or an indicator of quality/performance)

At step 308, the SLA server 60 translates the request into an architecture based on the content of the service catalog. In embodiments, the architecture module 75 of the SLA server 60 translates the request into an architecture based on the content of the service catalog. As noted above, the term "architecture" as used herein refers one or more hardware and/or software components (e.g., IT building blocks from the service catalog) necessary to address the request. Different types of architecture may be generated by the SLA server 60, including for example, a stretched cluster with associated software (i.e., a deployment model with two or more virtualization host servers as part of the same logical cluster but in separate locations), a stand-alone computer device with associated software, or an active-active architecture (including two active data centers having mutual protection) with associated software. It should be understood that IT building blocks required for the architecture may be different (e.g., greater) than those requested in the request.

In aspects, the architecture module 75 automatically generates the architecture utilizing service integration algorithms to determine which IT building blocks are necessary to meet the client's goals as represented by the request. The architecture module 75 may also utilize client specific data from the client database to determine the type of architecture required to meet the request. For example, the architecture module 75 may identify architecture components need to implement a disaster recovery component of a request, wherein the service integration algorithms are utilized to determine whether the client already has one or more of the architecture components, or whether new architecture components need to be obtained, provisioned or allocated based on the request. In aspects, the SLA server 60 maintains an updated service catalogue containing service integration algorithms and data needed to match IT building blocks to the request based on client data in order to generate an appropriate architecture.

At step 309, the SLA server 60 determines if the automatically generated architecture of step 308 meets the SLT set by the user. In embodiments, the SLA server 60 compares SLT indicators associated with one or more IT building blocks in the request with the select SLT in the request to determine if the SLT indicators meet or exceed the select SLT. In aspects, the lowest level of SLT indicator is considered the SLT for the IT building blocks in the request, and the SLA server 60 determines if the lowest level SLT indicator meets or exceeds the select SLT of the request. For example, a server selected in the request may have an SLT indicator of platinum and the select SLT in the request may be associated with the SLT indicator gold. In this case, the platinum SLT indicator provides a higher level of service than is required by the request SLT (i.e., gold level). Accordingly, the selected server would meet the client's goals as indicated by the request SLT selected by the client.

At step 310, when the architecture meets the select SLT of the request, the SLA server 60 automatically creates an infrastructure SLA based on the architecture, utilizing the architecture database 77. In embodiments, the SSL module 76 of the SLA server 60 is configured to perform step 310. In aspects, the SLA module 76 determines, based on the architecture database 77, which SLA components map to IT building blocks of the architecture generated at step 308, and generates an infrastructure SLA based on the SLA components. Predetermined rules may be utilized by the SSL module 76 when generating the infrastructure SLA from multiple SLA components. In embodiments, the term "infrastructure SLA" as used herein refers to a service level agreement (SLA) comprising one or more IT building blocks of the architecture (of step 309) and measurable objectives (e.g., MTTR, MTBF) associated with the one or more IT building blocks of the architecture.

At step 311, if the architecture does not meet the select SLT of the request, the SLA server 60 may send a notification to the client indicating that their SLT is not met by the request. Optionally, the notification may include one or more suggestions for resolving the difference between the select SLT of the request and the SLT indicators associated with IT building blocks of the service catalogue. For example, the SLA server 60 may send a notification to a client indicating that they will need to upgrade their current server in order to meet their business objectives as set forth in the request.

Figure 4:
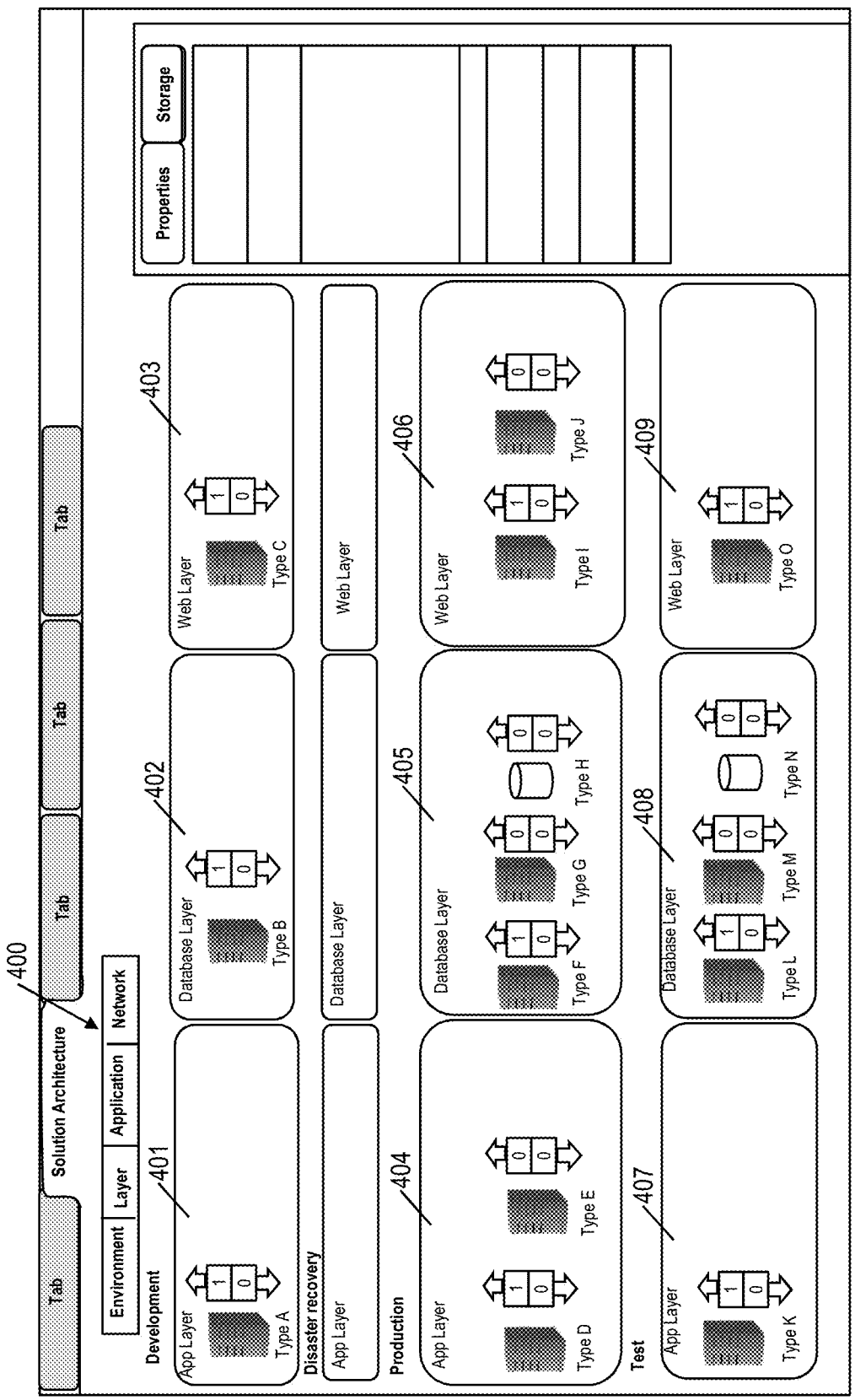
FIG. 4 depicts an exemplary service catalogue interface page in accordance with embodiments of the invention.

FIG. 4 is an exemplary service catalogue interface page in accordance with embodiments of the invention. In the example of FIG. 4, various user-selectable filter tabs 400 are available, enabling a client to filter IT building blocks by environment, layer, application and network, for example. In the example of FIG. 4, a Solution Architecture page is viewable by a client, and a plurality of IT building blocks indicated at 401-409 are available for selection by the client.

Figure 5:
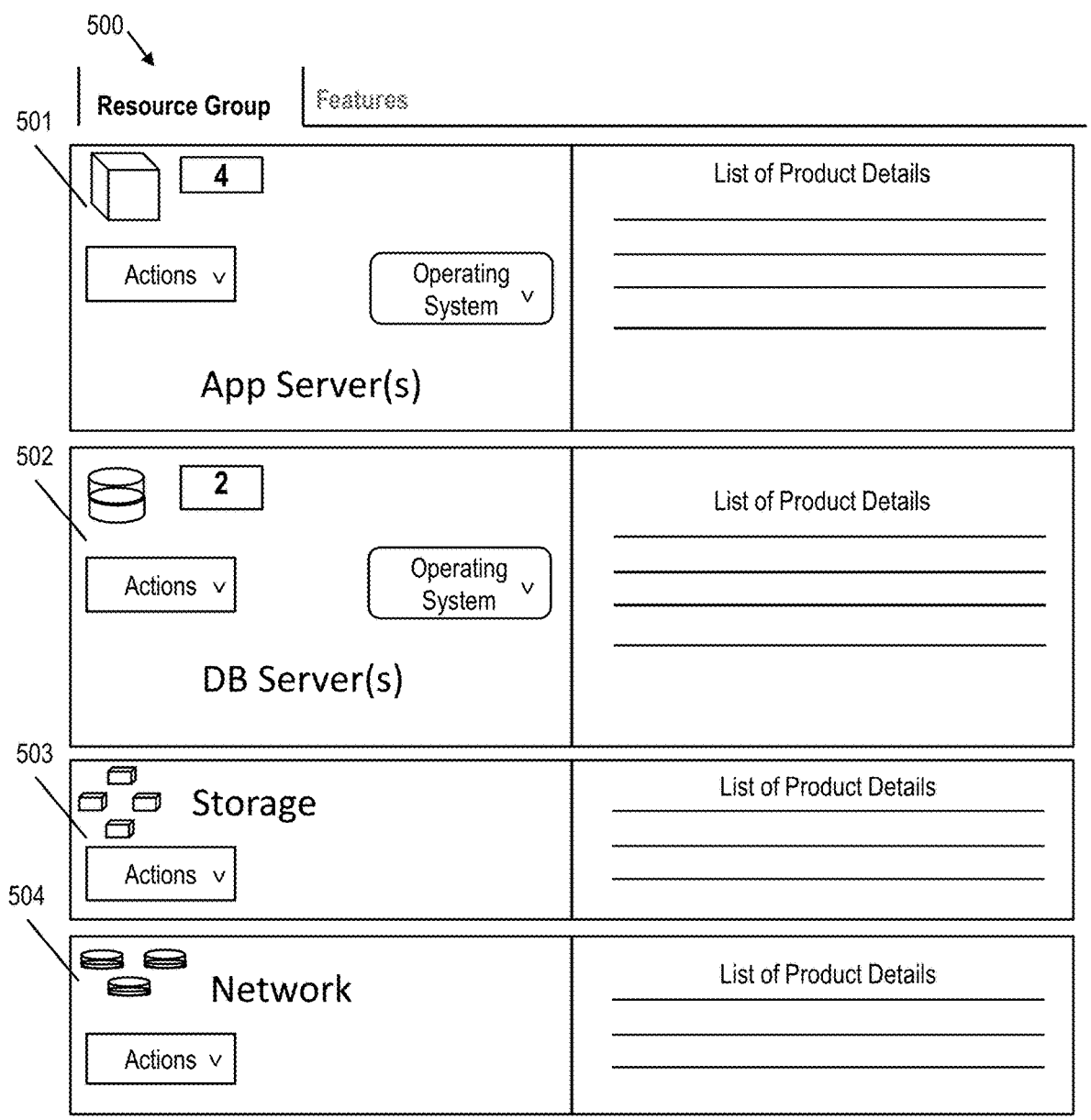
FIG. 5 depicts an exemplary service catalogue interface page illustrating selectable IT components for inclusion in a request in accordance with aspects of the invention.

FIG. 5 is an exemplary service catalogue interface page illustrating selectable IT components for inclusion in a request. In the example of FIG. 5, a Resource Groups tab 500 enables a client to select from a plurality of IT building blocks (e.g., application servers 501, database servers 502, storage tools 503 and network tools 504), and actions to take with respect to those IT building blocks. The service catalogue pages of FIGS. 4 and 5 are included for illustrative purposes only, and the service catalogue of the present invention is not intended to be limited to those options/layouts shown.

Figure 6:
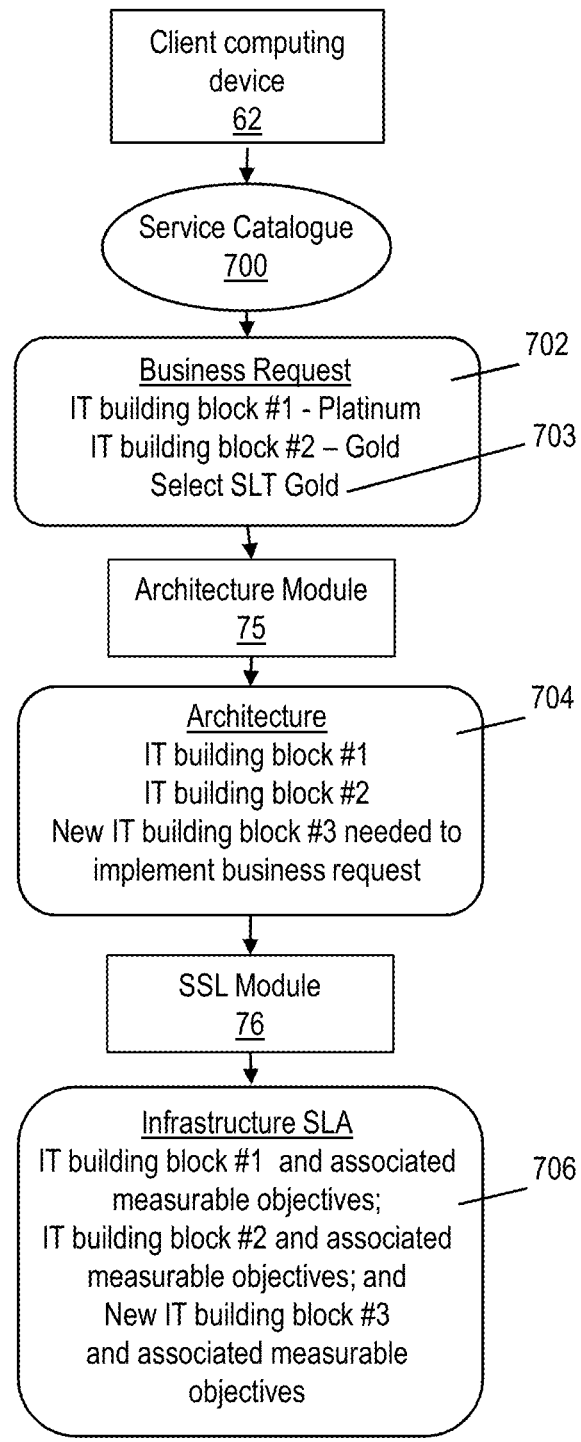
FIG. 6 is a flow diagram representing a process in accordance with aspects of the invention.

FIG. 6 is a flow diagram representing a process of the present invention. Steps to implement the process of FIG. 6 include those discussed in FIGS. 3A and 3B, and incorporate components from FIG. 2. In an exemplary use scenario, a client accesses the service catalogue 700 (i.e., a cloud services portal) via a client computing device 62, and generates a request 702 using selections from the service catalogue 700. In this example, the Service Catalogue 700 provides the client with: a price estimate; a predetermined service level applicability with a genericized measurement methodology addressing core service levels (e.g., platinum, gold, silver, bronze), with optional business continuity or resiliency; toolsets for measurement and reporting; and service level effective dates (e.g., calculated based on a required project(s) implementation duration). The SLA server 60 receives a request from the client for an analysis of current business process performance data to meet their business continuity and disaster recovery goals, along with an SLT indicator of "gold" depicted at 703, in accordance with step 307 of FIG. 3. The architecture module 75 of the SLA server 60 receives the request 702 with a SLT indicator and then generates an architecture based on the request and utilizing information from the service catalogue, including service integration algorithms and descriptions of services, in accordance with step 308 of FIG. 3.

In this exemplary use scenario, the SLA server 60 calculates MTBF and MTTR per incident for the client, and determines that the MTTR is 30 minutes and the MTBF is equal to 30 months (based on 1 SLT failure per calendar year). In order to meet the client's request at the level of "gold", the SLA server 60 determines that an additional data center (DC) site is needed for an active-active solution (including business continuity and disaster recovery). Accordingly, the SLA server 60 generates an architecture 704 including the additional data center cite (e.g., new IT building block #3 in FIG. 6). The architecture 704 is then utilized by the SSL module 76 to automatically generate an infrastructure SLA 706 based on an integrated database of architecture design elements and logged SLA components (architecture database 77). In this example, the new infrastructure SLA 706 includes the IT building block #1, the IT building block #2 and the new IT building block #3 of the architecture, as well as one or more associated measurable objectives.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for automatically generating standard SLAs for architectures. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a computing device, a request from a client, the request including: one or more select information technology (IT) building blocks selected from a plurality of IT building blocks in an online service catalogue; and a select service level target (SLT) from a plurality of predetermined SLTs in the service catalogue;
   automatically generating, by the computing device, an architecture based on the request utilizing the service catalogue, the architecture comprising at least one IT building block different from the one or more select IT building blocks, wherein the architecture is capable of meeting objectives of the request;
   determining, by the computing device, that the architecture meets the select SLT;
   accessing, by the computing device, an architecture database comprising predefined service level agreement (SLA) components mapped to each of the plurality of IT building blocks in the service catalogue; and
   automatically generating, by the computing device, an infrastructure SLA based on the architecture utilizing the architecture database, wherein the infrastructure SLA comprises the at least one building block of the architecture and measurable objectives associated with the at least one building block of the architecture.

2. The method of claim 1, further comprising mapping, by the computing device, the predefined SLA components to each of the plurality of IT building blocks in the service catalogue and saving the resulting mapped data in the architecture database.

3. The method of claim 1, further comprising recording, by the computing device, real delivery performance data based on mean time between failure (MTBF) data and mean time to repair (MTTR) data received.

4. The method of claim 3, further comprising automatically updating, by the computing device, the service catalogue based on the real delivery performance data, wherein the plurality of IT building blocks are each associated with MTBF data and MTTR data.

5. The method of claim 1 wherein the plurality of SLTs comprise SLTs of different service levels, and wherein the determining that the architecture meets the select SLT comprises comparing stored SLTs, associated with each of the one or more select IT building blocks, with the select SLT, wherein the architecture meets the select SLT when all of the stored SLTs are of a service level equal to or greater than the select SLT.

6. The method of claim 1, wherein the automatically generating the architecture based on the request utilizing the service catalogue comprises utilizing service integration algorithms saved in the service catalogue to determine the at least one IT building block different from the one or more select IT building blocks needed to meet the objectives of the request.

7. The method of claim 1, wherein the providing the service catalogue comprises hosting the service catalog on a network connecting a remote computing device of the client to the computing device.

8. A computer program product for automatically generating standard service level agreements for architectures, the computer program product comprising a computer readable storage medium having program instructions embodied therewith, the program instructions executable by a computing device to cause the computing device to:
provide a service catalogue comprising a plurality of information technology (IT) building blocks and a plurality of predetermined service level targets (SLTs);
receive a request from a client;
automatically generate an architecture to meet objectives of the request utilizing the service catalogue;
access an architecture database comprising predefined service level agreement (SLA) components mapped to each of the plurality of IT building blocks in the service catalogue; and
automatically generate an infrastructure SLA based on the architecture utilizing the architecture database, wherein the infrastructure SLA comprises measurable objectives associated with one or more hardware or software components of the architecture.

9. The computer program product of claim 8, wherein:
the request includes one or more select IT building blocks from the plurality of IT building blocks in the service catalogue and a select service level target (SLT) from the plurality of predetermined SLTs in the service catalogue;
the architecture comprising the one or more hardware or software components selected from the plurality of IT building blocks in the service catalogue;
the infrastructure SLA further comprises the one or more hardware or software components selected from the plurality of IT building blocks in the service catalogue; and
the program instructions further cause the computing device to determine that the architecture meets the select SLT.

10. The computer program product of claim 8, wherein the program instructions further cause the computing device to map the predefined SLA components to each of the plurality of IT building blocks in the service catalogue and save the resulting mapped data in the architecture database.

11. The computer program product of claim 8, wherein the program instructions further cause the computing device to record real delivery performance data based on mean time between failure (MTBF) and mean time to repair (MTTR) data received.

12. The computer program product of claim 11, wherein the program instructions further cause the computing device to automatically update the service catalogue based on the real delivery performance data, wherein the plurality of IT building blocks are each associated with MTBF data and MTTR data.

13. The computer program product of claim 8, wherein the plurality of SLTs comprise SLTs of different service levels, and wherein the determining that the architecture meets the select SLT comprises comparing stored SLTs, associated with each of the one or more select IT building blocks, with the select SLT, wherein the architecture meets the select SLT when all of the stored SLTs are of a service level equal to or greater than the select SLT.

14. The computer program product of claim 8, wherein the providing the service catalogue comprises hosting the service catalog on a network connecting a remote computing device of the client to the computing device.

15. A system for automatically generating standard service level agreements for architectures, comprising:
a CPU, a computer readable memory and a computer readable storage medium associated with a computing device;
program instructions to receive a request from a client, the request including one or more select IT building blocks from a plurality of IT building blocks in a service catalogue and a select service level target (SLT) from a plurality of predetermined SLTs in the service catalogue;
program instructions to automatically generate an architecture to meet objectives of the request utilizing the service catalogue, wherein the architecture comprising one or more hardware or software components selected from the plurality of IT building blocks in the service catalogue;
program instructions to determine that the architecture meets the select SLT;
program instructions to access an architecture database comprising predefined service level agreement (SLA) components mapped to each of the plurality of IT building blocks in the service catalogue; and
program instructions to automatically generate an infrastructure SLA based on the architecture utilizing the architecture database, wherein the infrastructure SLA comprises the one or more hardware or software components selected from the plurality of IT building blocks in the service catalogue, as well as measurable objectives associated with the one or more hardware or software components,
wherein the program instructions are stored on the computer readable storage medium for execution by the CPU via the computer readable memory.

16. The system of claim 15, further comprising:
program instructions to provide the service catalogue comprising the plurality of information technology (IT) building blocks and the plurality of predetermined service level targets (SLTs).

17. The system of claim 15, further comprising program instructions to map the predefined SLA components to each of the plurality of IT building blocks in the service catalogue and save the resulting mapped data in the architecture database.

18. The system of claim 15, further comprising program instructions to record real delivery performance data based on mean time between failure (MTBF) data and mean time to repair (MTTR) data received.

19. The system of claim 18, further comprising program instructions to automatically update the service catalogue based on the real delivery performance data, wherein the plurality of IT building blocks are each associated with MTBF data and MTTR data.

20. The system of claim 15, wherein the plurality of SLTs comprise SLTs of different service levels, and wherein the determining that the architecture meets the select SLT comprises comparing stored SLTs, associated with each of the one or more select IT building blocks, with the select SLT, wherein the architecture meets the select SLT when all of the stored SLTs are of a service level equal to or greater than the select SLT.

* * * * *